US010513867B2

(12) United States Patent
Lindsey et al.

(10) Patent No.: US 10,513,867 B2
(45) Date of Patent: Dec. 24, 2019

(54) APPARATUS AND METHOD FOR HELICOPTER ERECTION OF EMERGENCY RESTORATION STRUCTURE

(71) Applicant: LINDSEY MANUFACTURING CO., Azusa, CA (US)

(72) Inventors: Keith E. Lindsey, La Canada, CA (US); Matthew Knowles, Riverside, CA (US)

(73) Assignee: Lindsey Manufacturing Co., Azusa, CA (US)

( * ) Notice: Subject to any disclaimer, the term of this patent is extended or adjusted under 35 U.S.C. 154(b) by 0 days.

(21) Appl. No.: 15/299,332

(22) Filed: Oct. 20, 2016

(65) Prior Publication Data

US 2017/0114565 A1 Apr. 27, 2017

Related U.S. Application Data

(60) Provisional application No. 62/244,701, filed on Oct. 21, 2015.

(51) Int. Cl.
*E04H 12/34* (2006.01)
*B64D 1/02* (2006.01)
(Continued)

(52) U.S. Cl.
CPC ............. *E04H 12/342* (2013.01); *B64D 1/02* (2013.01); *B64D 1/22* (2013.01); *E04H 12/10* (2013.01);
(Continued)

(58) Field of Classification Search
CPC ....... E04H 12/342; E04H 12/10; E04H 12/20; E04H 2012/006; B64D 1/02; B64D 1/22;
(Continued)

(56) References Cited

U.S. PATENT DOCUMENTS 2,857,994 A * 10/1958 Sheard .................... E04H 12/34
                                                                                                                                             182/178.2
3,182,761 A * 5/1965 Goodrum ................ E04H 12/10
                                                                                                                                             52/116
(Continued)

FOREIGN PATENT DOCUMENTS

DE         294 313 A5     9/1991
DE     43 00 144 A1     7/1994
(Continued)

OTHER PUBLICATIONS

International Search Report for corresponding International Application No. PCT/US16/57987, filed Oct. 20, 2016, International Search Report dated Dec. 15, 2016 and dated Jan. 9, 2017 (2 pgs.).

(Continued)

*Primary Examiner* — Joshua K Ihezie
(74) *Attorney, Agent, or Firm* — Lewis Roca Rothgerber Christie LLP

(57) ABSTRACT

An apparatus for helicopter erection of an emergency restoration structure, and a method of helicopter erection of an emergency restoration structure using the same are provided. An apparatus for helicopter erection of an emergency restoration structure includes a first alignment frame portion attachable to a first section of an emergency restoration structure; a second alignment frame portion attachable to a second section of the emergency restoration structure; an alignment portion arranged on at least one of the first alignment frame portion and the second alignment frame portion; and a hook configured to receive a portion of at least one of the first alignment frame portion and the second alignment frame portion.

15 Claims, 16 Drawing Sheets

(51) Int. Cl.
*B64D 1/22* (2006.01)
*E04H 12/20* (2006.01)
*E04H 12/10* (2006.01)
*E04H 12/24* (2006.01)
*B64C 27/04* (2006.01)
*E04H 12/00* (2006.01)

(52) U.S. Cl.
CPC ............ *E04H 12/20* (2013.01); *E04H 12/24* (2013.01); *B64C 27/04* (2013.01); *E04H 2012/006* (2013.01)

(58) Field of Classification Search
CPC ........ B64C 2201/024; B64C 2201/027; B64C 2201/022; B64C 2201/128; B64C 29/00; B64C 27/04
USPC .................................. 52/40, 651.05, 745.17
See application file for complete search history.

(56) References Cited

U.S. PATENT DOCUMENTS

| | | | | |
|---|---|---|---|---|
| 3,233,374 | A * | 2/1966 | Micheels | A47B 57/485 211/107 |
| 4,028,792 | A * | 6/1977 | Tax | B66C 23/283 254/89 H |
| 4,356,498 | A | 10/1982 | Pollard | |
| 4,378,919 | A * | 4/1983 | Smith | B64D 1/22 244/118.1 |
| 5,601,038 | A * | 2/1997 | Welch | A47B 55/02 108/107 |
| 7,156,245 | B2 * | 1/2007 | Lissandre | B66C 23/70 212/177 |
| 7,954,657 | B2 * | 6/2011 | Holly | B66C 23/70 212/177 |
| 8,375,650 | B2 | 2/2013 | Gratzer | |
| 9,127,650 | B2 * | 9/2015 | Moestrup | E04H 12/342 |
| 2003/0213765 | A1 * | 11/2003 | St-Germain | B66B 7/027 212/294 |
| 2008/0078128 | A1 * | 4/2008 | Livingston | F03D 13/10 52/40 |
| 2009/0211174 | A1 * | 8/2009 | Henderson | E04H 12/182 52/40 |
| 2010/0032237 | A1 * | 2/2010 | Anasis | E04G 1/20 182/113 |
| 2011/0283640 | A1 | 11/2011 | Miller | |
| 2013/0259634 | A1 * | 10/2013 | Raz | B64D 1/12 414/801 |
| 2013/0276386 | A1 * | 10/2013 | Donnally | E21B 15/00 52/123.1 |

FOREIGN PATENT DOCUMENTS

| | | |
|---|---|---|
| EP | 2 846 041 A1 | 3/2015 |
| GB | 2493948 A | 2/2013 |
| WO | WO 2015/049520 A1 | 4/2015 |

OTHER PUBLICATIONS

Written Opinion of the International Searching Authority for corresponding International Application No. PCT/US16/57987, filed Oct. 20, 2016, Written Opinion of the International Searching Authority dated Jan. 9, 2017 (6 pgs.).

European Search Report from corresponding European Application No. 16858248.4, European Search Report dated Jun. 26, 2019 and dated Jul. 4, 2019 (9 pgs.).

First Examination Report from corresponding Australian Application No. 2016341967, First Examination Report dated Feb. 18, 2019 (3 pgs.).

* cited by examiner

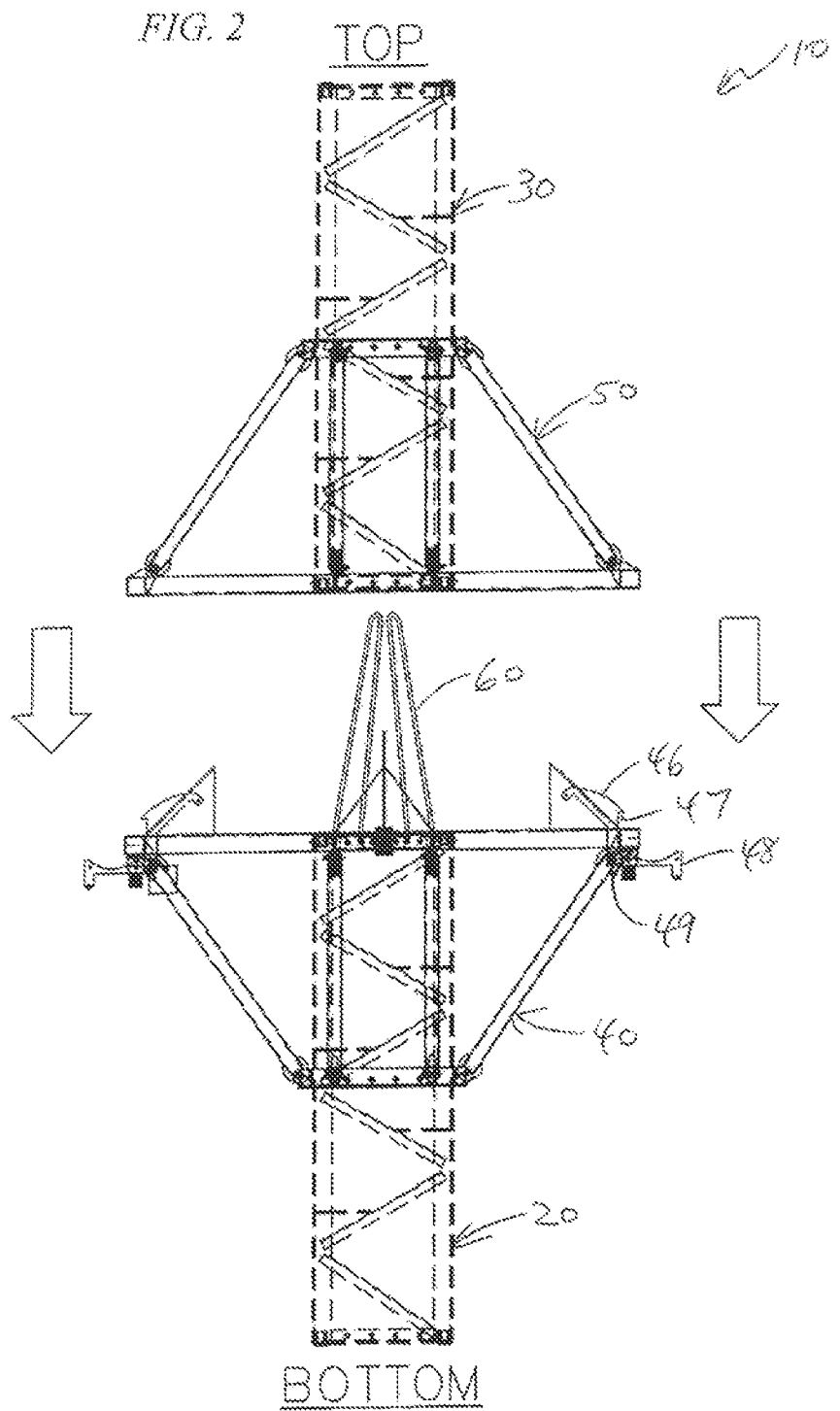

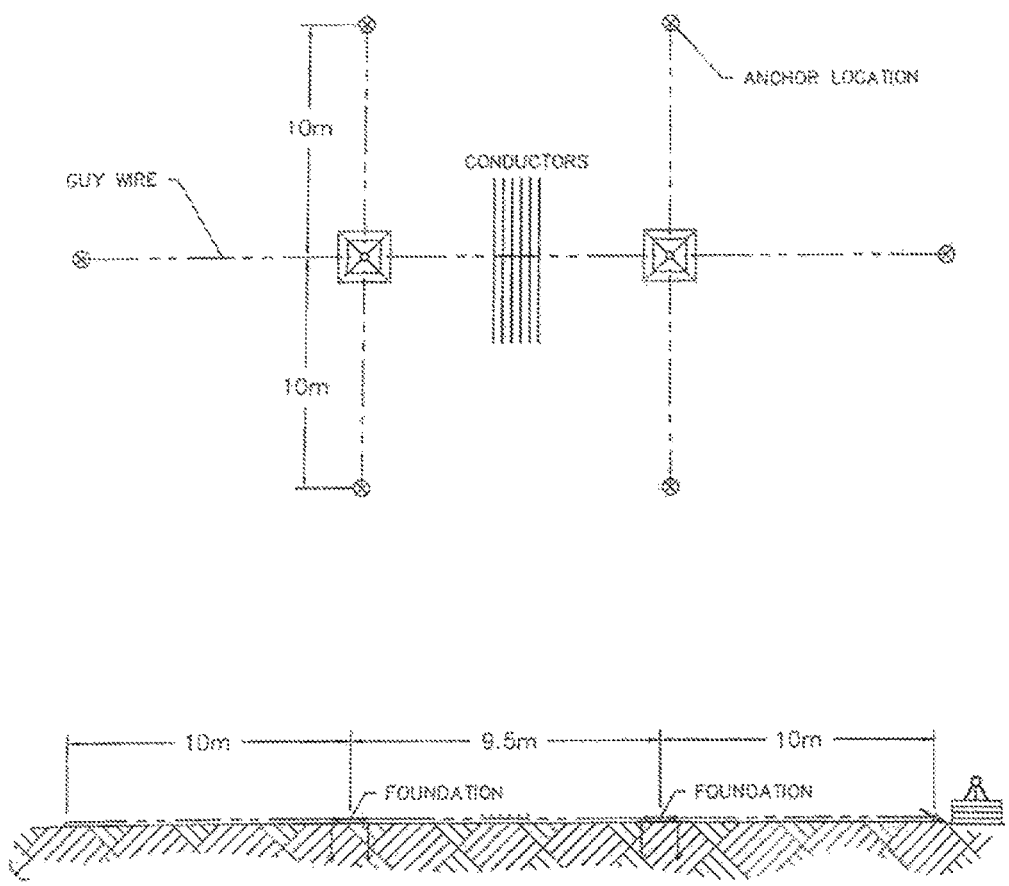

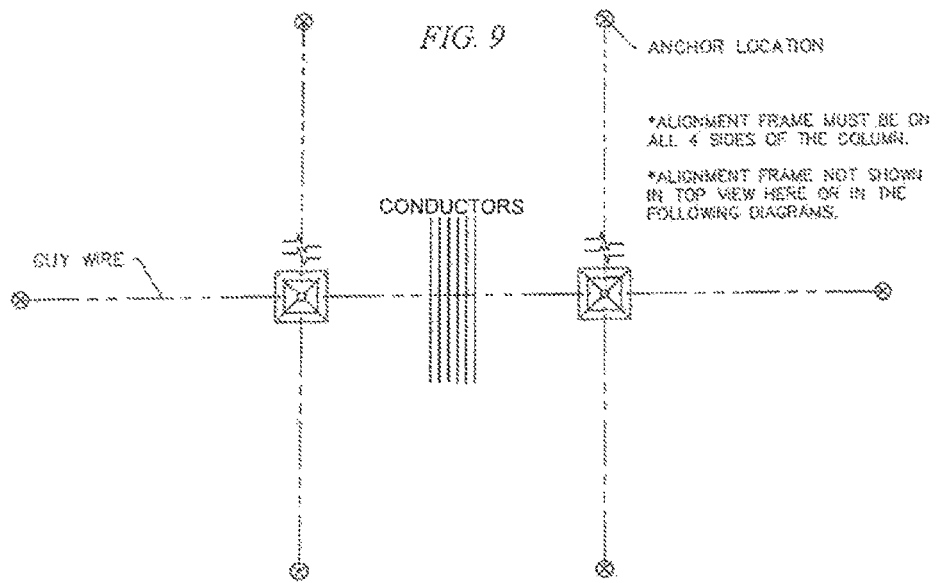
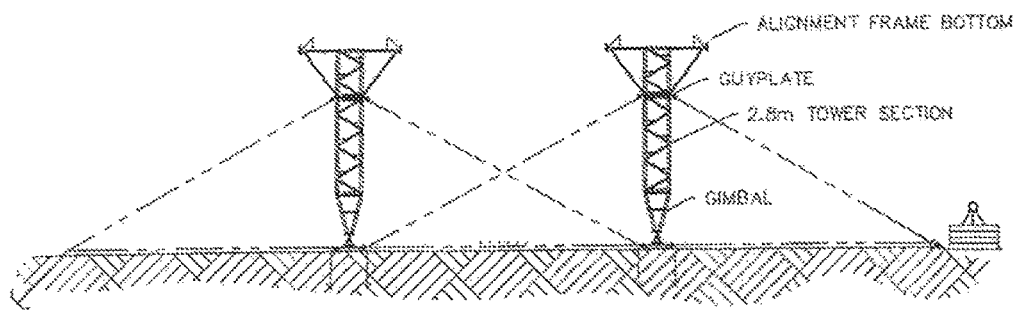
2. ASSEMBLE BOTTOM SECTIONS AND ALIGNMENT FRAME (i.e. GIMBAL, ONE 2.8m SECTION, GUYPLATE, AND ALIGNMENT FRAME BOTTOM)
3. PLUMB THE TWO COLUMNS USING TURNBUCKLES (PLUMB WITHIN ±1°)

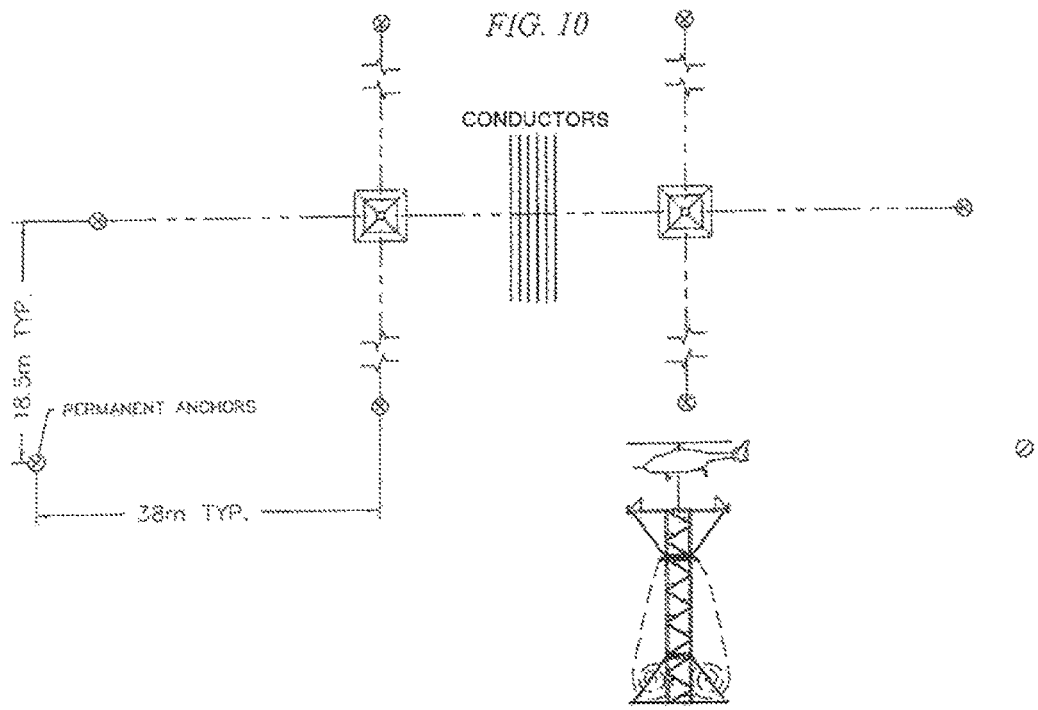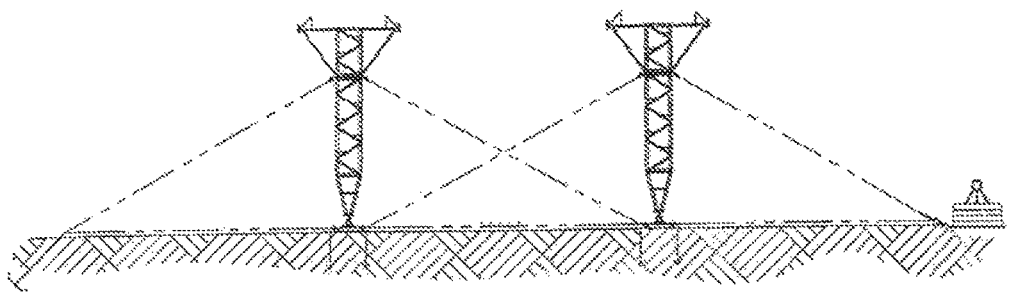
FIG. 10
4. FLY IN TOP SECTIONS WITH ALIGNMENT FRAME TOP.
5. HELICOPTER RELEASES THE TOP SECTION.
6. PERMANENT GUY WIRES ARE HELD TO THE TOP TOWER ASSEMBLY.

APPARATUS AND METHOD FOR HELICOPTER ERECTION OF EMERGENCY RESTORATION STRUCTURE

CROSS-REFERENCE TO RELATED APPLICATION

This application claims the benefit of U.S. Provisional Patent Application Ser. No. 62/244,701, filed on Oct. 21, 2015, the entire content of which is hereby incorporated by reference.

FIELD

Aspects of embodiments of the present invention relate to an apparatus for helicopter erection of an emergency restoration structure, and a method of helicopter erection of an emergency restoration structure using the same.

BACKGROUND

A support structure, or tower, for a transmission line may be damaged, such as by acts of nature or sabotage. Typically, restoration of a damaged transmission line requires construction of a new foundation and replacement of damaged tower steel. However, it may not be efficient or economically feasible to perform the necessary repairs to the permanent structures. In order to quickly and reliably restore an electrical power supply through the area of damage, an emergency restoration system may be configured.

An emergency restoration structure is a component of an emergency restoration system that supports a transmission line which was previously supported by the permanent support structure. The emergency restoration structure may be a truss-like tower or frame of lightweight aluminum components. For example, a pair of emergency restoration structures may be erected to support a transmission line passing therebetween. It may be desirable to transport and erect the emergency restoration structures via helicopter, such as in mountainous regions. However, the emergency restoration structure may be a tall structure with a small foundation and may be erected in a region having high wind speeds. Additionally, the emergency restoration structure typically includes a number of sections to be arranged one on top of another and fastened together, and difficulties arise in aligning the sections when lowering one section onto another using a helicopter. Further, it is dangerous for a worker to be under the helicopter and the sections of the emergency restoration structure during such a process.

SUMMARY

According to an aspect of embodiments of the present invention, an apparatus for helicopter erection of an emergency restoration structure provides for safe, efficient, and cost-effective alignment and installation of sections of an emergency restoration structure.

According to another aspect of embodiments of the present invention, a method of helicopter erection of an emergency restoration structure provides for safe, efficient, and cost-effective alignment and installation of sections of an emergency restoration structure.

According to another aspect of embodiments of the present invention, an emergency restoration structure includes an apparatus for safe, efficient, and cost-effective helicopter erection of the emergency restoration structure.

According to one or more embodiments of the present invention, an apparatus for helicopter erection of an emergency restoration structure includes an alignment frame including a bottom portion configured to be coupled to an upper region of a first section of the emergency restoration structure, and a top portion configured to be coupled to a lower region of a second section of the emergency restoration structure.

According to one or more embodiments of the present invention, an apparatus for helicopter erection of an emergency restoration structure includes: a first alignment frame portion attachable to a first section of an emergency restoration structure; a second alignment frame portion attachable to a second section of the emergency restoration structure; an alignment portion arranged on at least one of the first alignment frame portion or the second alignment frame portion; and a hook configured to receive a portion of at least one of the first alignment frame portion or the second alignment frame portion.

The alignment portion may include a plurality of inclined surfaces. The hook may extend through an opening of an inclined surface of the plurality of inclined surfaces.

The apparatus may further include an energy absorbing member extending away from at least one of the first alignment frame portion or the second alignment frame portion and configured to abut an inner surface of at least one of the first section or the second section. The energy absorbing member may include at least one of a rod or a wire.

The apparatus may further include a counterweight coupled to the hook, the hook may be pivotable about a pivot to receive the portion of the at least one of the first alignment frame portion or the second alignment frame portion, and the counterweight may be configured to maintain the first alignment frame portion or the second alignment frame portion captured in a recess of the hook.

According to one or more embodiments of the present invention, a method of erection of an emergency restoration structure including a first tower section, a second tower section, and a first alignment frame including a bottom portion coupled to the first tower section and a top portion coupled to the second tower section includes: lowering the second section onto the first section such that the second section is aligned with the first section by an alignment portion of the first alignment frame; and capturing a portion of the alignment frame to a hook of the first alignment frame.

The second tower section may be lowered onto the first tower section using a helicopter.

The method may further include guying a foundation at ground level; lowering the first tower section onto the foundation; and guying the first tower section to an anchor.

The method may further include, after lowering the second tower section onto the first tower section, fastening the second tower section to the first tower section, and guying the second tower section to an anchor.

The method may further include, after fastening the second tower section to the first tower section, removing the first alignment frame from the first and second tower sections.

The method may further include, after fastening the second tower section to the first tower section, lowering a third section of the emergency restoration structure onto the second section such that the third section is aligned with the second section by an alignment portion of a second alignment frame of the emergency restoration structure; and capturing a portion of the second alignment frame to a hook of the second alignment frame.

According to one or more embodiments of the present invention, an emergency restoration structure includes: a first tower section including a first end configured to be mounted to a foundation, and a second end opposite the first end; a second tower section including a first end configured to be coupled to the second end of the first tower section, and a second end opposite the first end of the second tower section; and a first alignment frame including a bottom portion configured to be coupled to the second end of the first tower section, and a top portion configured to be coupled to the first end of the second tower section, the first alignment frame including: an alignment portion arranged on at least one of the bottom portion or the top portion; and a hook configured to receive a portion of at least one of the bottom portion or the top portion.

The alignment portion may include a plurality of inclined surfaces. The first alignment frame may further include an energy absorbing member extending away from at least one of the top portion or the bottom portion and configured to abut an inner surface of at least one of the first section or the second section. The energy absorbing member may include at least one of a rod or a wire.

The emergency restoration structure may further include: a third tower section including a first end configured to be coupled to the second end of the second tower section, and a second end opposite the first end of the third tower section; and a second alignment frame including a bottom portion configured to be coupled to the second end of the second tower section, and a top portion configured to be coupled to the first end of the third tower section, the second alignment frame including: an alignment portion arranged on at least one of the bottom portion of the second alignment frame or the top portion of the second alignment frame; and a hook configured to receive a portion of at least one of the bottom portion of the second alignment frame or the top portion of the second alignment frame.

BRIEF DESCRIPTION OF THE DRAWINGS

The above and other features and aspects of embodiments of the present invention will become better understood with regard to the following description and accompanying drawings, where:

FIG. 2 is a front view of top and bottom sections of an emergency restoration structure with an apparatus for helicopter erection of an emergency restoration structure, according to an embodiment of the present invention.

FIGS. 8 to 16 are schematic views showing tasks of a method of helicopter erection of an emergency restoration structure.

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive.

Figure 16:
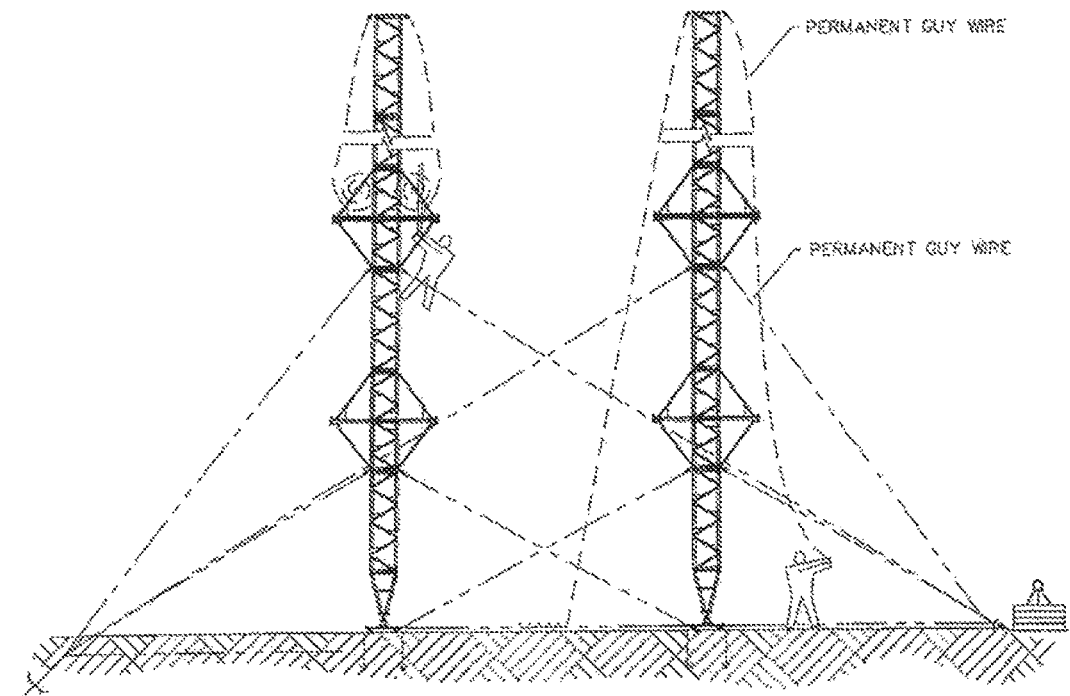

With reference to FIGS. 1-4, an emergency restoration structure with an apparatus for helicopter erection of the emergency restoration structure is shown. According to an embodiment of the present invention, an emergency restoration structure 10 includes a bottom section 20 and a top section 30 configured to be lowered onto and assembled to the bottom section 20. Each of the bottom section 20 and the top section 30 may be assembled as a truss-like structure having four sides and a plurality of beam members or plate members connected to one another, such as by welds, threaded fasteners, rivets, or any other suitable device or combination of devices. The bottom section 20 and the top section 30, in one embodiment, may be formed of aluminum members; however, embodiments of the present invention are not limited thereto and, in other embodiments, may be formed of steel, stainless steel, fiberglass, or any other suitable material. When assembled together, the bottom section 20 and the top section 30 are connected to each other, such as by welds or fasteners, for example. While in the drawings, only the bottom section 20 and the top section 30 of the emergency restoration structure 10 are shown, in other embodiments, the emergency restoration structure 10 may include one or more additional sections arranged on the top section 30, as shown in FIG. 16, for example, and/or one or more additional sections may be arranged below the bottom section 20.

Figure 1:
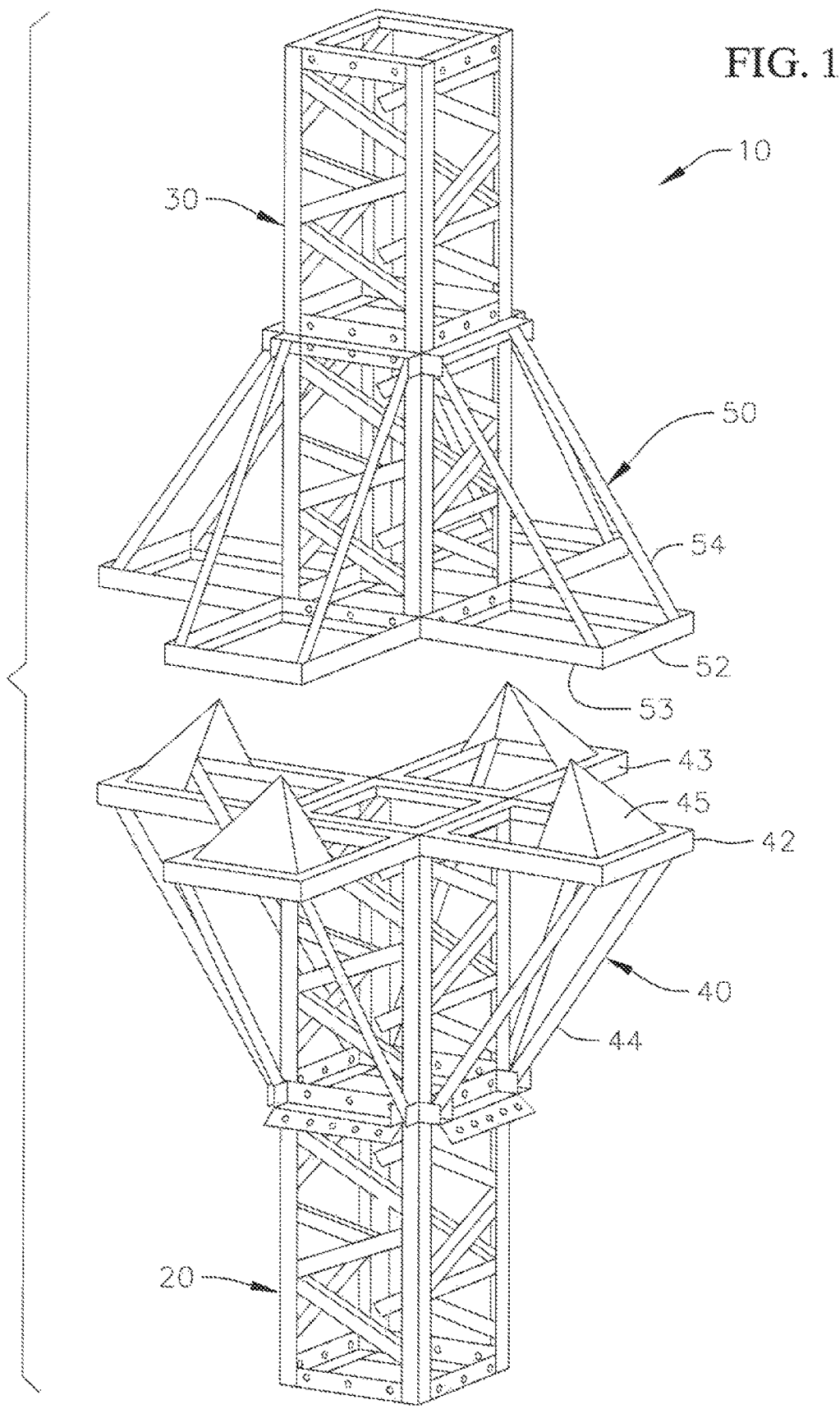
FIG. 1 is a schematic perspective view of top and bottom sections of an emergency restoration structure with an apparatus for helicopter erection of an emergency restoration structure, according to an embodiment of the present invention.

The apparatus for helicopter erection of the emergency restoration structure, in one embodiment, includes an alignment frame including a bottom portion 40 provided on the bottom section 20 and a top portion 50 provided on the top section 30. The alignment frame may be removably attached (e.g., via threaded fasteners) to the bottom section 20 and the top section 30, and may be formed of aluminum or any other suitable material or combination of materials. In one embodiment, as shown in FIG. 1, each of the bottom portion 40 and the top portion 50 of the alignment frame has four same or similar alignment portions arranged (e.g., symmetrically arranged) around a perimeter of the respective bottom section 20 and top section 30.

Figure 2A:
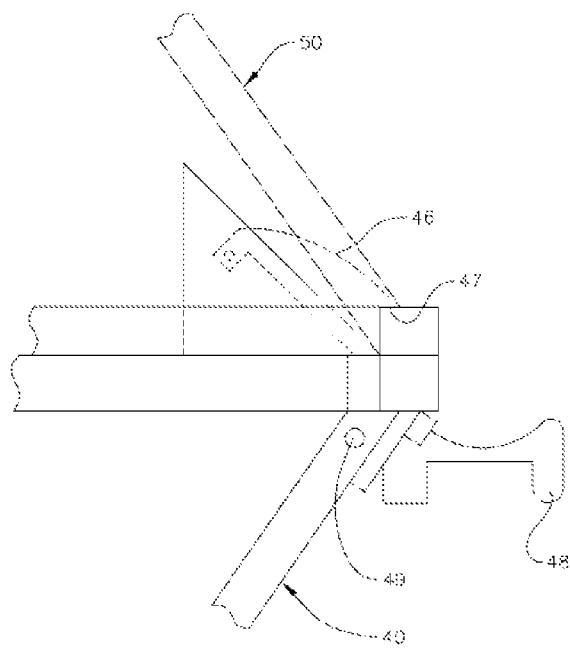
FIG. 2A is a front view of portions of the top and bottom sections of FIG. 2 shown in an assembled state.
Figure 3:
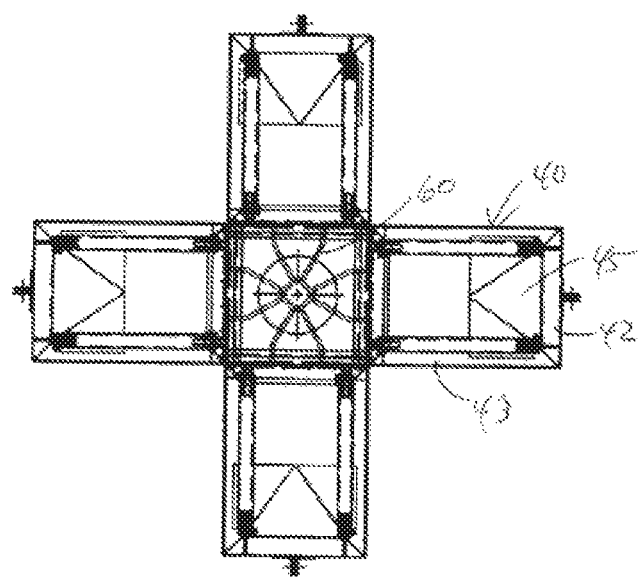
FIG. 3 is a top view of a bottom section of an emergency restoration structure with a bottom portion of an apparatus for helicopter erection of an emergency restoration structure, according to an embodiment of the present invention.
Figure 4:
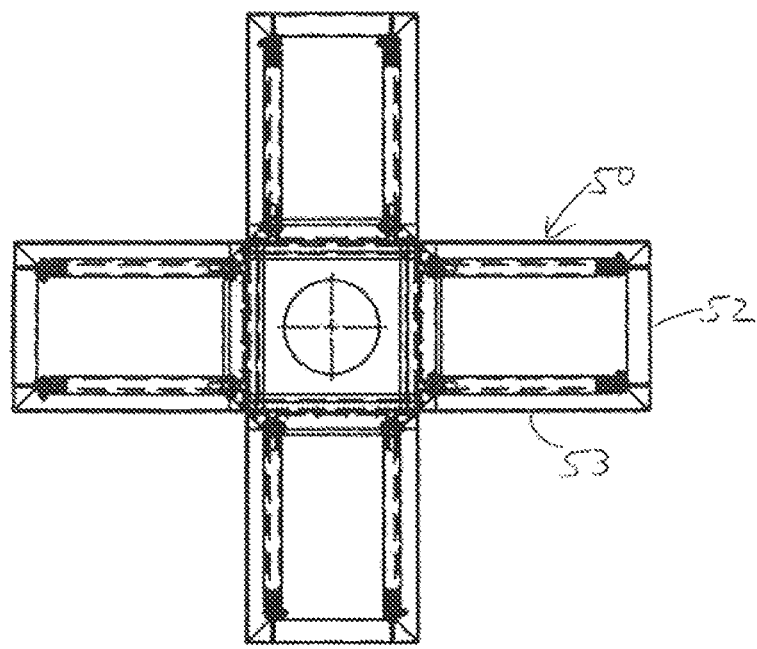
FIG. 4 is a top view of a top section of an emergency restoration structure with a top portion of an apparatus for helicopter erection of an emergency restoration structure, according to an embodiment of the present invention.
Figure 7:
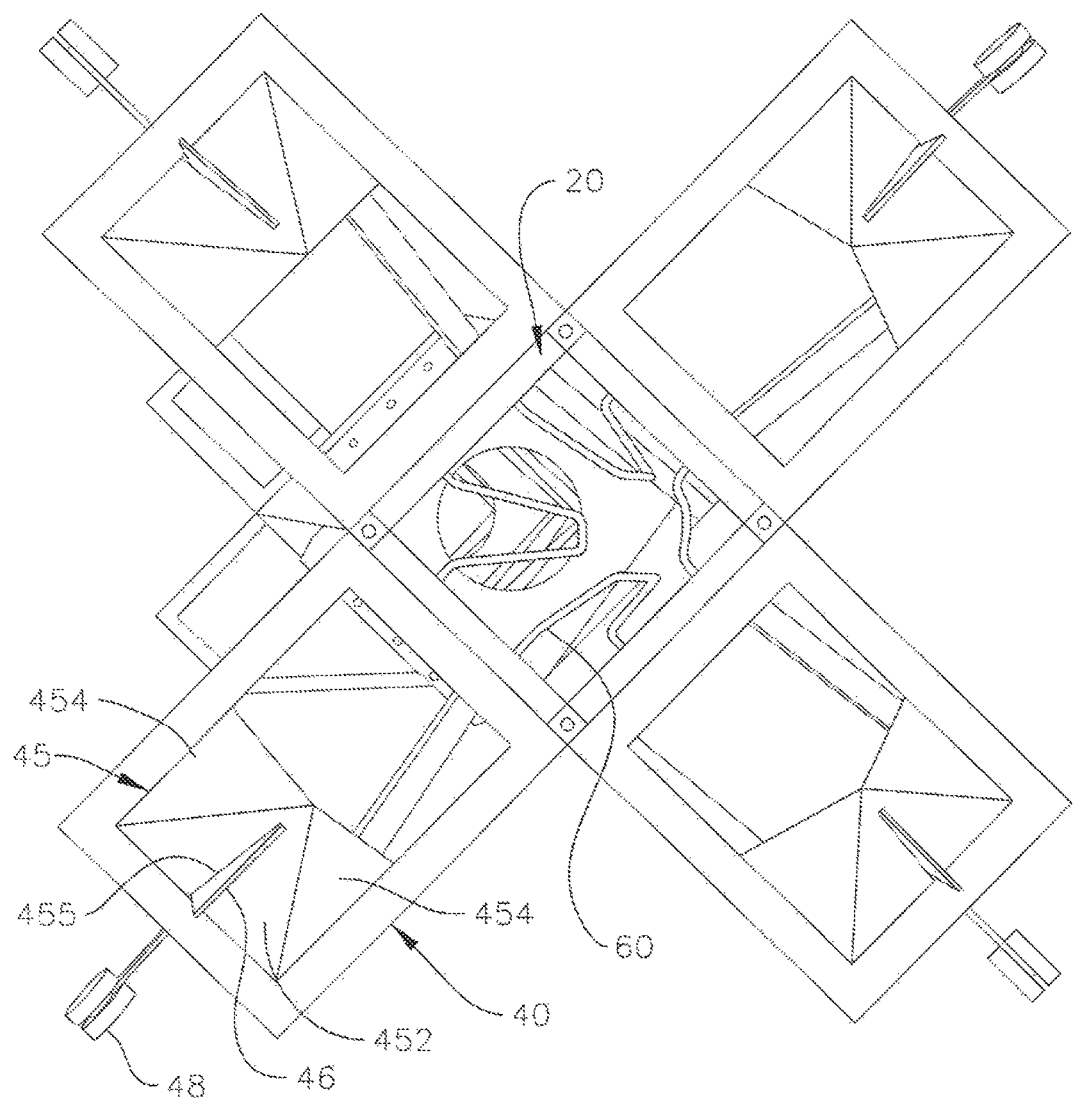
FIG. 7 is a top view of a bottom section of an emergency restoration structure with a bottom portion of an apparatus for helicopter erection of an emergency restoration structure, according to an embodiment of the present invention.

The bottom portion 40 of the alignment frame, in one embodiment, includes a cross bar 42 and a pair of extending bars 43 connected between the bottom section 20 and opposite ends of the cross bar 42. The bottom portion 40 of the alignment frame may further include a pair of support bars 44 connected between a region of the bottom section 20 below that at which the extending bars 43 are connected and opposite ends of the cross bar 42 for providing structural support to the bottom portion 40. The bottom portion 40 of the alignment frame further includes an alignment portion 45 which may be shaped as a section of a pyramid, as described in further detail below with reference to FIG. 7. The alignment portion 45 may be coupled (e.g., welded) to the cross bar 42 and outer portions of the extending bars 43. In one embodiment, as shown in FIGS. 2 and 7, the bottom portion 40 of the alignment frame includes a hook 46 having a recess 47 configured to receive and capture a portion of the top portion 50 of the alignment frame when the top section 30 is lowered onto the bottom section 20. The hook 46 may be coupled to a counterweight 48 and may be pivotable therewith about a pivot 49 to be held in a position to receive the portion of the top portion 50 in the recess 47 and thereafter maintain the portion of the top portion 50 captured in the recess 47, as shown in FIG. 2A.

The top portion 50 of the alignment frame, in one embodiment, includes a cross bar 52 and a pair of extending bars 53 connected between the top section 30 and opposite ends of the cross bar 52. The top portion 50 of the alignment frame may further include a pair of support bars 54 connected between a region of the top section 30 above that at which the extending bars 53 are connected and opposite ends of the cross bar 52 for providing structural support to the top portion 50. In one embodiment, the cross bar 52 is the portion of the top portion 50 that is configured to be received and captured in the recess 47 of the hook 46 of the bottom portion 40.

The apparatus for helicopter erection of the emergency restoration structure, in one embodiment, further includes one or more energy absorbing members 60 at the top of the top section 30. The energy absorbing members 60 may be a rod or wire members configured to abut inner surfaces 32 of the top section 30 and absorb vibration or movement as the top section 30 is lowered onto the bottom section 20, such as using a helicopter. The energy absorbing members 60 may be flexible and/or deformable.

In one embodiment, the top section 30 may be used as an intermediate section of an emergency restoration structure having more than two tower sections and, as such, the top section 30 may be provided with the top portion 50 of the alignment frame at the bottom end of the top section 30 and may further be provided with the bottom portion 40 of another alignment frame at the top end of the top section 30 for alignment with the top portion 50 of the another alignment frame which may be provided on another tower section of the emergency restoration structure to be lowered onto the top section 30. Further, while it is illustrated in the drawings and described herein that the bottom portion 40 of the alignment frame has the alignment portions 45 and the hooks 48, in other embodiments, one or more components of the apparatus for helicopter erection and the alignment frame may be reversed between the bottom portion 40 and the top portion 50 of the alignment frame. Further, while it is illustrated in the drawings and described herein that each of the bottom portion 40 and the top portion 50 of the alignment frame has four same or similar alignment portions arranged (e.g., symmetrically arranged) around a perimeter of the respective bottom section 20 and top section 30, the present invention is not limited thereto. For example, in an alternate embodiment, each of the bottom portion 40 and the top portion 50 of the alignment frame may have a pair of same or similar alignment portions arranged at opposite sides of the respective bottom section 20 and top section 30.

Figure 5:
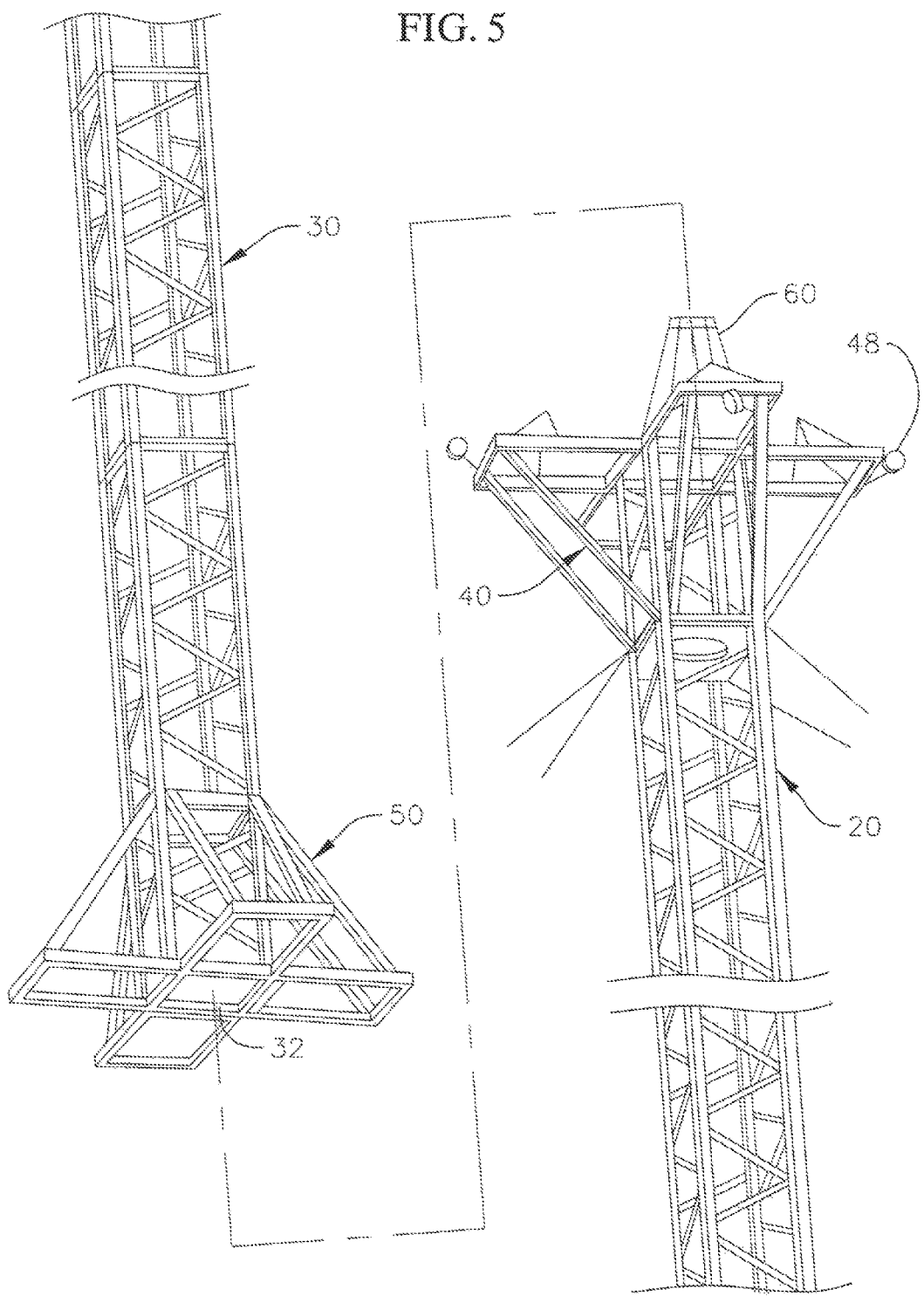
FIG. 5 is a front view of top and bottom sections of an emergency restoration structure with an apparatus for helicopter erection of an emergency restoration structure, according to an embodiment of the present invention.
Figure 6:
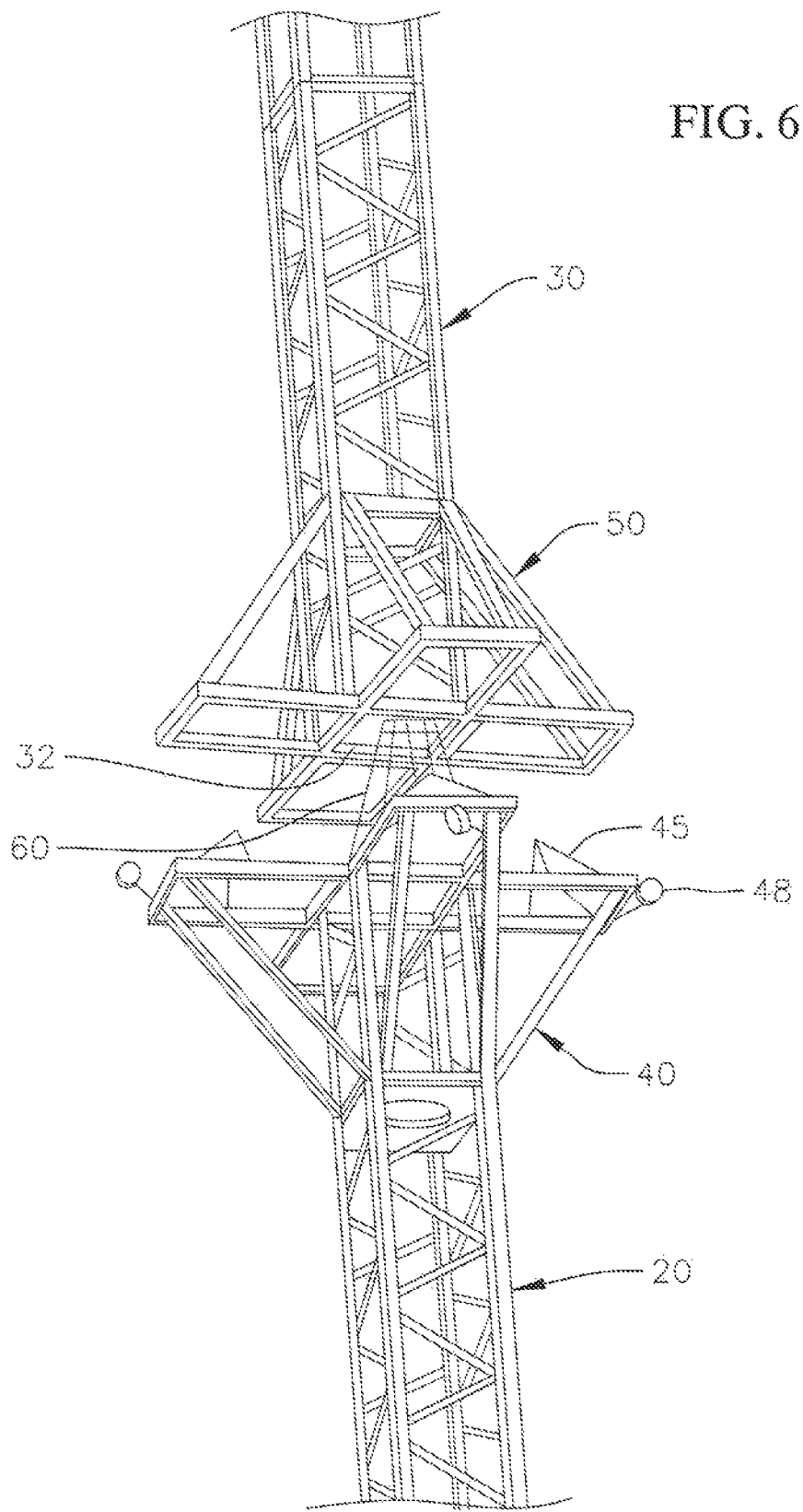
FIG. 6 is a front view of top and bottom sections of an emergency restoration structure with an apparatus for helicopter erection of an emergency restoration structure, according to an embodiment of the present invention.

With reference to FIG. 5, the bottom section 20 and the top section 30 are shown disassembled from each other. As illustrated, the bottom section 20 is provided with the bottom portion 40 of the alignment frame, and the top section 30 is provided with the top portion 50 of the alignment frame. Additionally, the energy absorbing members 60 are arranged at the top of the bottom section 20. With reference to FIG. 6, the top section 30 is shown raised above the bottom section 20 near to an assembled position. The bottom portion 40 of the alignment frame is configured to align the top portion 50 of the alignment frame, and the energy absorbing members 60 are configured to abut the inner surfaces 32 of the top section 30, as the top section 30 is lowered onto the bottom section 20, such as using a helicopter.

With reference to FIG. 7, a top of the bottom portion 40 of the alignment frame is shown in closer detail. As illustrated, the alignment portion 45 may have a central inclined face 452 and a pair of lateral inclined faces 454 on opposite sides of the central inclined face 452 to form a section of a pyramid. The inclined faces 452 and 454 of the alignment portion 45 are configured to abut and guide the cross bar 52 and the extending bars 53 of the top portion 50 of the alignment frame as the top section 30 is lowered onto the bottom section 20. As illustrated, the hook 46 may protrude upward through an opening 455 formed through the central inclined face 452 of the alignment portion 45 to capture the cross bar 52.

With reference to FIGS. 8 to 16, tasks of a method of helicopter erection of an emergency restoration structure according to an embodiment of the present invention are illustrated.

With reference to FIG. 8, a plan view and an elevation view are shown illustrating a task of setting first anchors and a foundation at ground level, and guying the foundation with a first guy wire. The first guy wire may be tightened with a turnbuckle, for example, and anchored at a suitable distance from the foundation. As shown in FIG. 8, a pair of foundations may be set at opposite sides of one or more conductors to be supported by the emergency restoration structure. Further, while some suitable distances between the pair of foundations and between the foundations and the anchor locations are shown in FIG. 8, embodiments of the present invention are not limited to these distances.

With reference to FIG. 9, a plan view and an elevation view are shown illustrating a task of assembling a bottom section, or bottom tower section, of the emergency restoration structure on each of the pair of foundations. In one embodiment, a gimbal is assembled on the foundation, and the bottom section is assembled on the gimbal. The bottom section may be plumbed, such as using a turnbuckle, and, in one embodiment, may be plumbed within plus or minus one degree, for example. The bottom section may be guyed to the anchors using second guy wires. Further, the bottom section is provided with a bottom portion of an alignment frame for alignment of a top section or an intermediate section of the emergency restoration structure to be assembled on the bottom section. The alignment frame may be the alignment frame or apparatus described above with reference to FIGS. 1 to 7. In FIG. 9, the bottom section or column of the emergency restoration structure is shown having a height of 2.8 m; however, embodiments of the present invention are not limited thereto.

With reference to FIG. 10, a plan view and an elevation view are shown illustrating a task of setting second anchors at ground level, and providing a top section or intermediate section of the emergency restoration structure to be assembled on the bottom section. As shown in the plan view, the second anchors may be located at a greater distance from the respective foundations than the first anchors and, in one embodiment, may be permanent anchors. While some suitable distances between the foundations and the second anchor locations are shown in FIG. 10, embodiments of the present invention are not limited to these distances. The second anchors may be used for guying the top section or intermediate section of the emergency restoration structure with a guy wire after being assembled on the bottom section. As illustrated in the elevation view, the top section or intermediate section of the emergency restoration structure may be provided to be arranged on the bottom section via helicopter; however, embodiments of the present invention are not limited thereto. That is, in other embodiments of the present invention, the top section or intermediate section of the emergency restoration structure may be aligned with and arranged on the bottom section using a crane or other suitable device. Also, the top section or intermediate section of the emergency restoration structure may be provided with third guy wires to be subsequently anchored at the second anchors.

Figure 11:
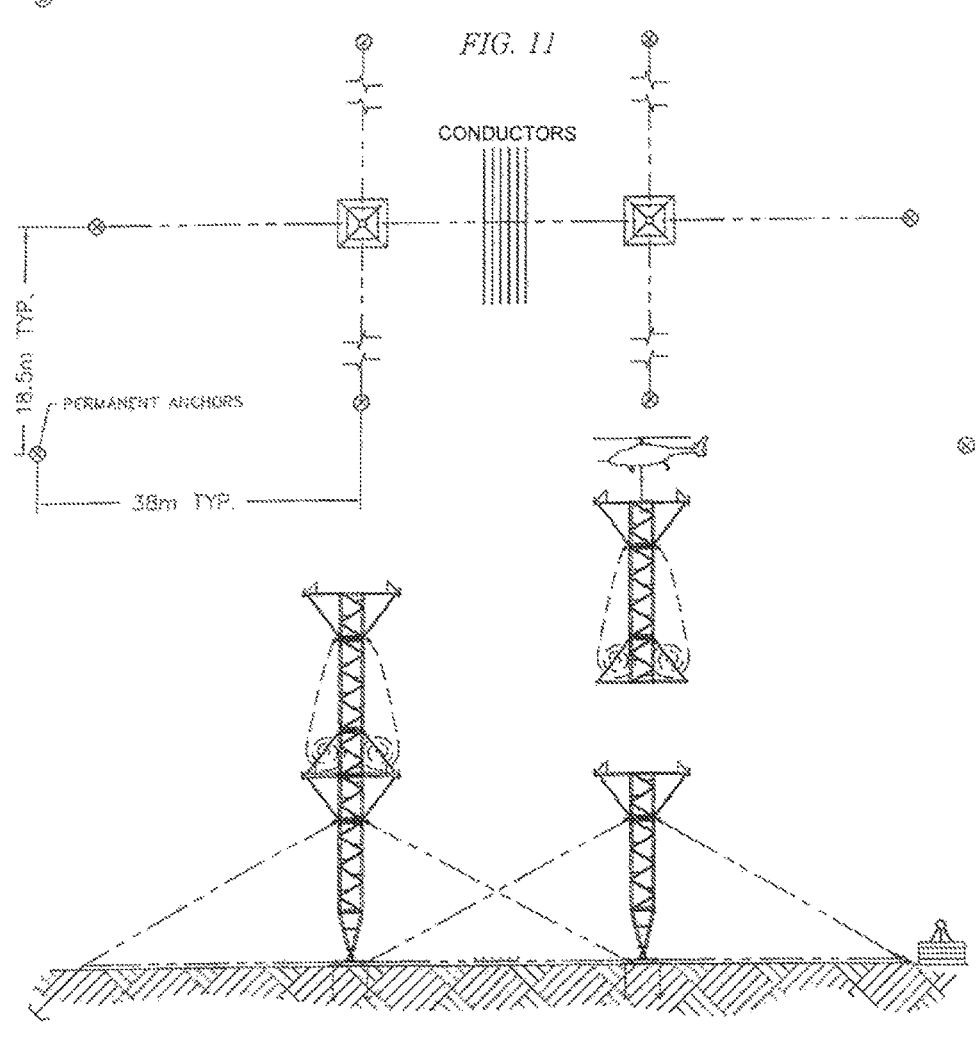

With reference to FIG. 11, the top section or intermediate section of the emergency restoration structure arranged on the bottom section is released by the helicopter, and another top section or intermediate section of the emergency restoration structure may be provided (e.g., by helicopter), arranged on another one of the bottom sections, and released. The top section or intermediate section of the emergency restoration structure is provided with a top portion of an alignment frame for alignment with the bottom portion provided with the bottom section of the emergency restoration structure. In an embodiment, the top section 30 is lowered onto the bottom section 20 such that the bottom portion 40 of the alignment frame aligns the top portion 50 of the alignment frame, and the energy absorbing members 60 may abut inner surfaces of the top section 30 to facilitate alignment and absorb vibration or movement. Additionally, the inclined faces of the alignment portion 45 may abut and guide the cross bar 52 and the extending bars 53 of the top portion 50 of the alignment frame as the top section 30 is lowered onto the bottom section 20, and the hook 46 may protrude upward, such as through an opening formed through the central inclined face of the alignment portion 45, to capture the cross bar 52. As illustrated in FIG. 11, where the section arranged on the bottom section is an intermediate section of an emergency restoration structure, the intermediate section may further include a bottom portion of another alignment frame for alignment of a top section or another intermediate section of the emergency restoration structure to be assembled on the intermediate section. The another alignment frame may be the alignment frame or apparatus described above with reference to FIGS. 1 to 7.

Figure 12:
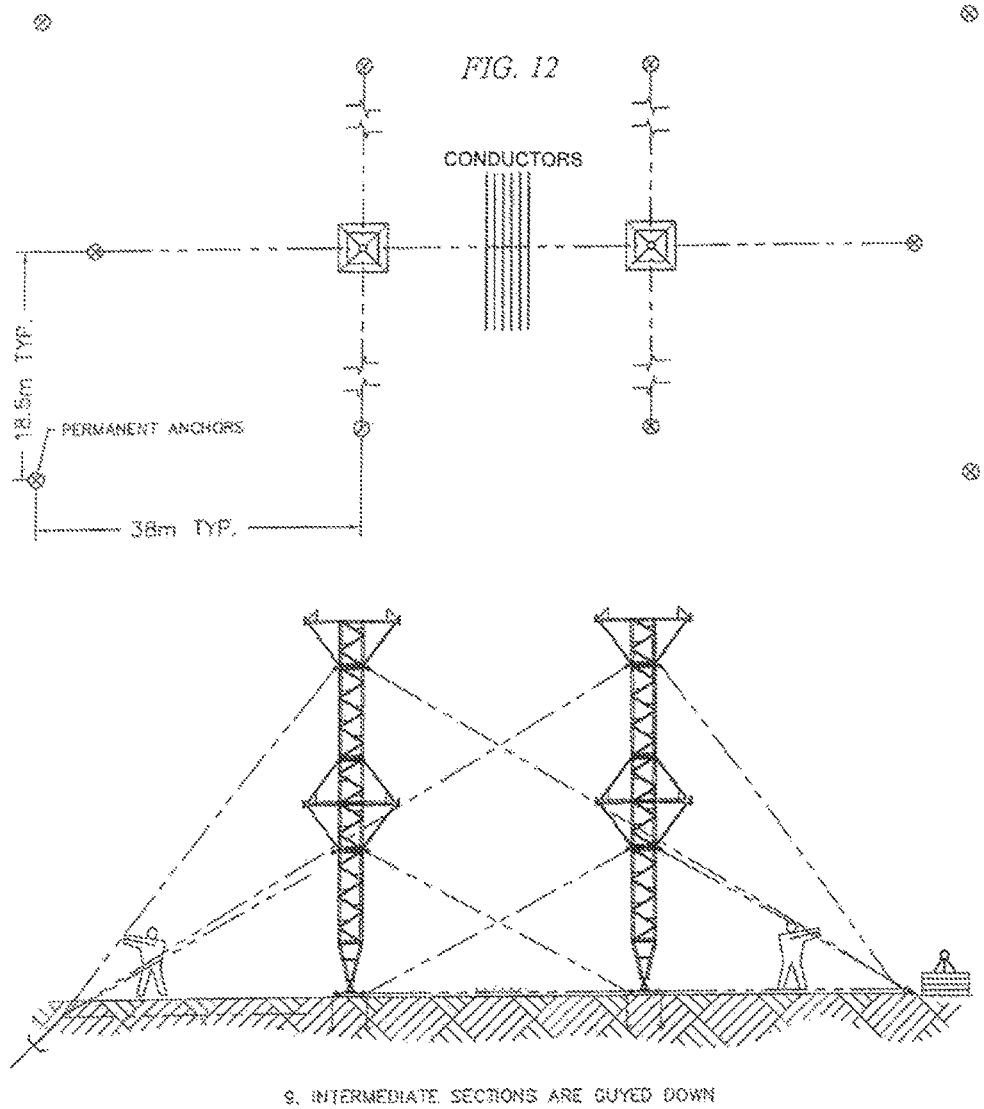

With reference to FIG. 12, the intermediate section of the emergency restoration structure is guyed down using the third guy wires. Subsequent to the intermediate section being arranged on the bottom section (e.g., by helicopter) and released, a worker may climb the emergency restoration structure and fasten the intermediate section to the bottom section, and also release the third guy wires to be anchored.

Figure 13:
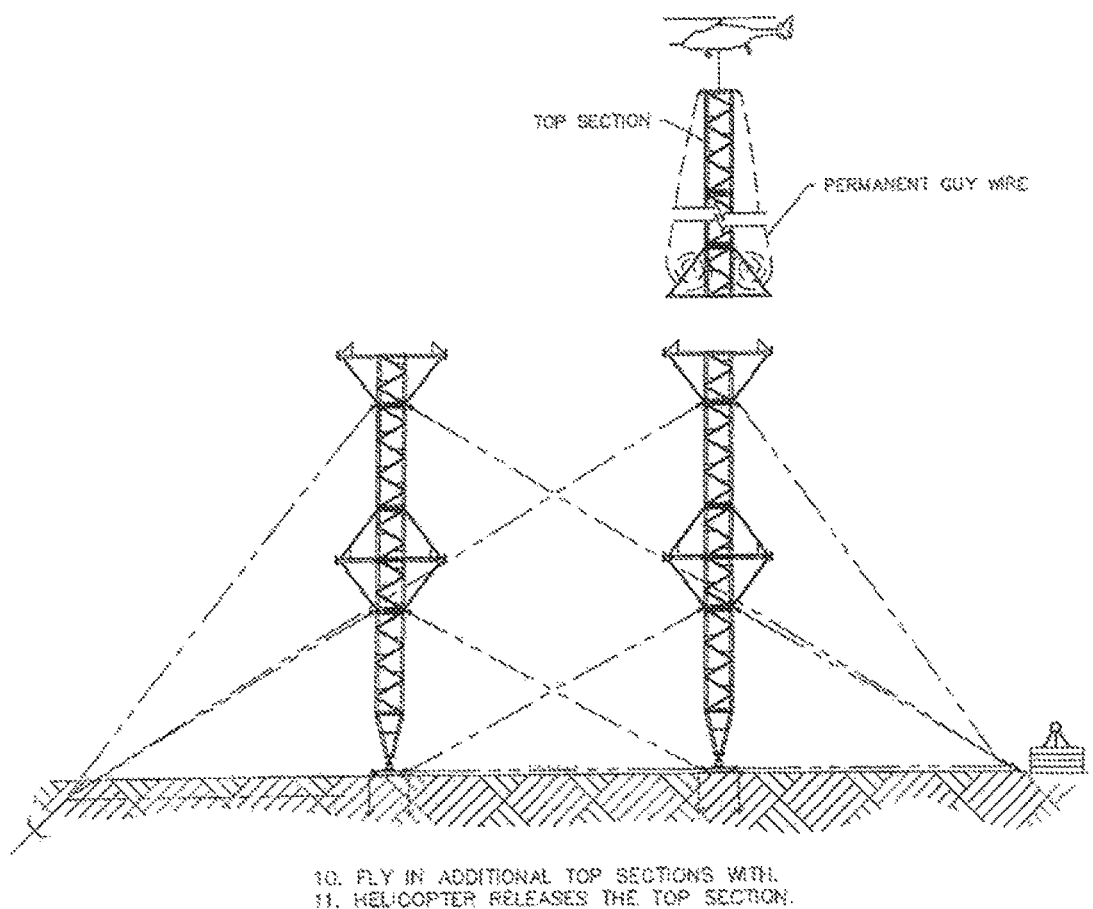
Figure 14:
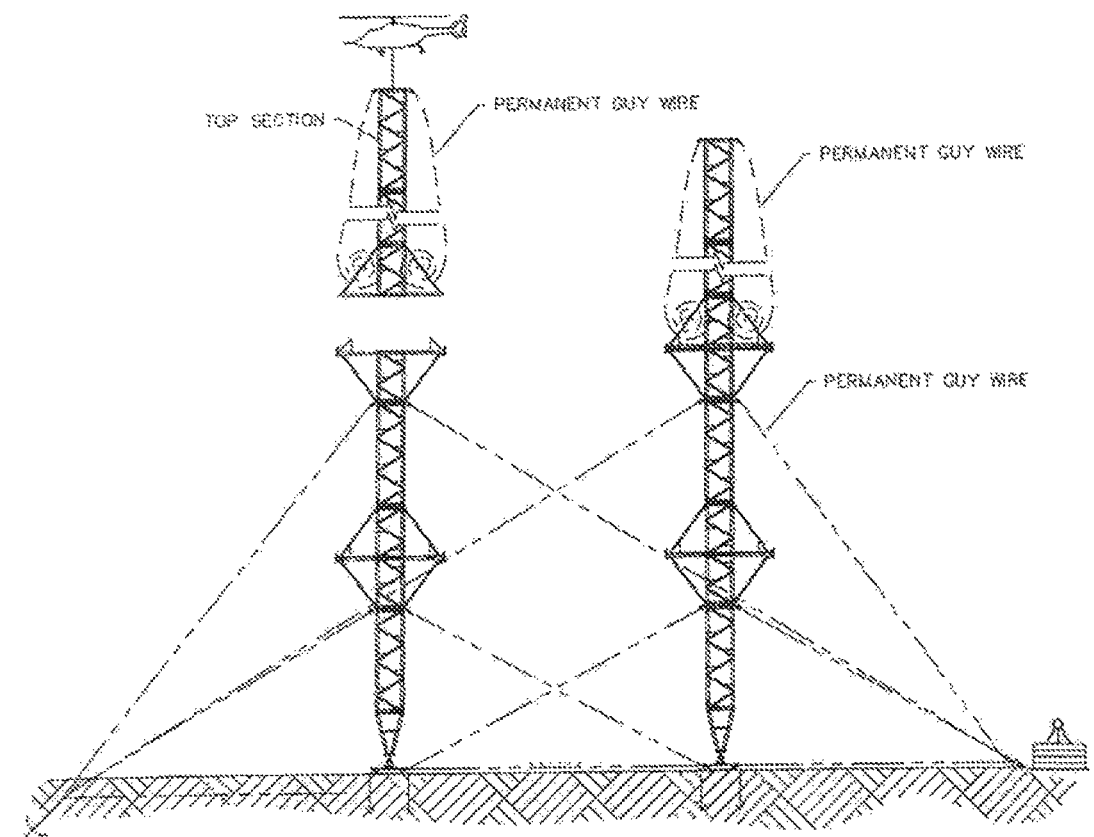

With reference to FIGS. 13 and 14, the top section of the emergency restoration structure may be provided to be arranged on the intermediate section, such as via helicopter. The top section of the emergency restoration structure may be provided with fourth guy wires to be subsequently anchored at the second anchors, for example. The top section of the emergency restoration structure arranged on the intermediate section is released by the helicopter, and another top section of the emergency restoration structure may be provided (e.g., by helicopter), arranged on another one of the intermediate sections, and released. The top section of the emergency restoration structure is provided with a top portion of an alignment frame for alignment with the bottom portion provided at the top of the intermediate section of the emergency restoration structure.

Figure 15:
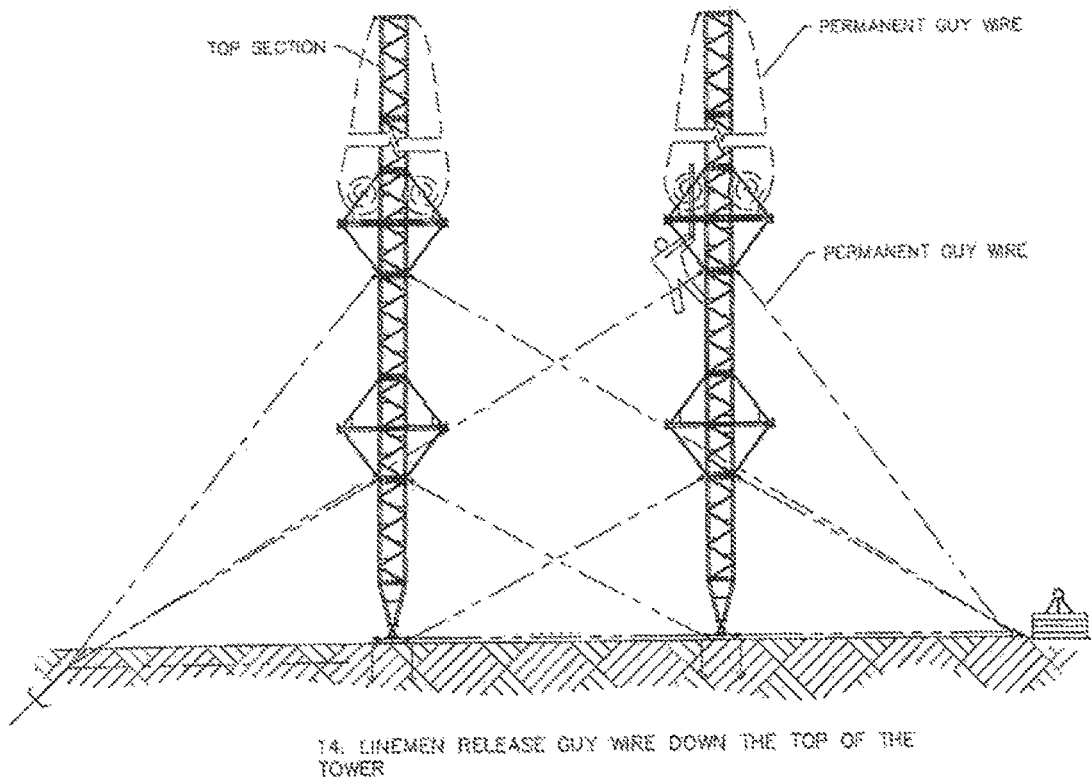

With reference to FIGS. 15 and 16, the top section of the emergency restoration structure is guyed down using the fourth guy wires. Subsequent to the top section being arranged on the intermediate section (e.g., by helicopter) and released, a worker may climb the emergency restoration structure and fasten the top section to the intermediate section, and also release the fourth guy wires to be anchored. While an emergency restoration structure having three tower sections is illustrated in the drawings, embodiments of the present invention are not limited thereto. That is, in other embodiments, the emergency restoration structure may have two tower sections or may have more than three tower sections.

Although not shown in the drawings, in one embodiment, after the intermediate section or top section is fastened to the bottom section, the top and bottom portions of the alignment frame may be removed from the intermediate section or top section and the bottom section. In another embodiment, the top and bottom portions of the alignment frame may be maintained on the intermediate section or top section and the bottom section, and the hook of the bottom portion may be unlatched from the top portion via a rope to disassemble the emergency restoration structure, such as using a helicopter.

While in one embodiment, the method of helicopter erection of an emergency restoration structure may include each of the tasks described above and shown in FIGS. 8 to 16, in other embodiments of the present invention, in a method of helicopter erection of an emergency restoration structure, one or more of the tasks described above and shown in FIGS. 8 to 16 may be absent and/or additional tasks may be performed. Further, in the method of helicopter erection of an emergency restoration structure according to one embodiment, the tasks may be performed in the order depicted in FIGS. 8 to 16. However, the present invention is not limited thereto and, in a method of dynamic real time transmission line monitoring according to one or more other embodiments of the present invention, the tasks described above and shown in FIGS. 8 to 16 may be performed in any other suitable sequence.

Although the drawings and accompanying description illustrate some exemplary embodiments of an apparatus for helicopter erection of an emergency restoration structure, and a method of helicopter erection of an emergency restoration structure using the same, it will be apparent that the novel aspects of the present invention may also be carried out by utilizing alternative structures, sizes, shapes, and/or materials in embodiments of the present invention. Also, in other embodiments, components described above with respect to one embodiment may be included together with or interchanged with those of other embodiments.

The preceding description has been presented with reference to certain embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. An apparatus for helicopter erection of an emergency restoration structure, the apparatus comprising:

a first alignment frame portion attachable to a first section of an emergency restoration structure, the first section being assembled as a truss-like structure, and the first alignment frame portion being attachable to the first section so as to surround a perimeter of the first section;

a second alignment frame portion attachable to a second section of the emergency restoration structure, the second section being assembled as a truss-like structure, and the second alignment frame portion being attachable to the second section so as to surround a perimeter of the second section;

an alignment portion arranged on at least one of the first alignment frame portion and the second alignment frame portion, the alignment portion comprising a plurality of inclined surfaces configured to abut and guide respective portions of the other of the first alignment frame portion and the second alignment frame portion as the other of the first alignment frame portion and the second alignment frame portion is moved in a longitudinal direction toward the at least one of the first alignment frame portion and the second alignment frame portion; and a hook arranged on the first alignment frame portion and configured to receive a cross bar of the second alignment frame portion.

2. An apparatus for helicopter erection of an emergency restoration structure, the apparatus comprising:
a first alignment frame portion attachable to a first section of an emergency restoration structure, the first section being assembled as a truss-like structure, and the first alignment frame portion being attachable to the first section so as to surround a perimeter of the first section;
a second alignment frame portion attachable to a second section of the emergency restoration structure, the second section being assembled as a truss-like structure, and the second alignment frame portion being attachable to the second section so as to surround a perimeter of the second section;
an alignment portion arranged on at least one of the first alignment frame portion and the second alignment frame portion; and
a hook configured to receive a portion of at least one of the first alignment frame portion and the second alignment frame portion,
wherein the alignment portion comprises a plurality of inclined surfaces,
wherein the hook extends through an opening of an inclined surface of the plurality of inclined surfaces.

3. An apparatus for helicopter erection of an emergency restoration structure, the apparatus comprising:
a first alignment frame portion attachable to a first section of an emergency restoration structure, the first section being assembled as a truss-like structure, and the first alignment frame portion being attachable to the first section so as to surround a perimeter of the first section;
a second alignment frame portion attachable to a second section of the emergency restoration structure, the second section being assembled as a truss-like structure, and the second alignment frame portion being attachable to the second section so as to surround a perimeter of the second section;
an alignment portion arranged on at least one of the first alignment frame portion and the second alignment frame portion;
a hook arranged on the first alignment frame portion and configured to receive a cross bar of the second alignment frame portion; and
an energy absorbing member extending away from at least one of the first alignment frame portion or the second alignment frame portion and configured to abut an inner surface of at least one of the first section or the second section.

4. The apparatus of claim 3, wherein the energy absorbing member comprises at least one of a rod or a wire.

5. An apparatus for helicopter erection of an emergency restoration structure, the apparatus comprising:
a first alignment frame portion attachable to a first section of an emergency restoration structure, the first section being assembled as a truss-like structure, and the first alignment frame portion being attachable to the first section so as to surround a perimeter of the first section;
a second alignment frame portion attachable to a second section of the emergency restoration structure, the second section being assembled as a truss-like structure, and the second alignment frame portion being attachable to the second section so as to surround a perimeter of the second section;
an alignment portion arranged on at least one of the first alignment frame portion and the second alignment frame portion;
a hook configured to receive a portion of at least one of the first alignment frame portion and the second alignment frame portion; and
a counterweight coupled to the hook, wherein the hook is pivotable about a pivot to receive the portion of the at least one of the first alignment frame portion or the second alignment frame portion, and the counterweight is configured to maintain the first alignment frame portion or the second alignment frame portion captured in a recess of the hook.

6. A method of erection of an emergency restoration structure, the emergency restoration structure including a first section, a second section, and a first alignment frame including a bottom portion coupled to a second end of the first section and a top portion coupled to a first end of the second section, a first end of the first section that is opposite the second end of the first section being configured to be mounted to a foundation, the first section being assembled as a truss-like structure, the bottom portion being coupled to the first section so as to surround a perimeter of the first section, the second section being assembled as a truss-like structure, and the top portion being coupled to the second section so as to surround a perimeter of the second section, the method comprising:
lowering the second section onto the first section such that the second section is aligned with the first section by an alignment portion of the first alignment frame, the alignment portion being arranged on at least one of the bottom portion and the top portion, the alignment portion comprising a plurality of inclined surfaces configured to abut and guide respective portions of the other of the bottom portion and the top portion as the other of the bottom portion and the top portion is moved in a longitudinal direction toward the at least one of the bottom portion and the top portion; and
capturing a portion of the first alignment frame to a hook of the first alignment frame, the hook arranged on one of the bottom portion and the top portion and receiving a cross bar of the other of the bottom portion and the top portion.

7. The method claim 6, wherein the second section is lowered onto the first section using a helicopter.

8. The method of claim 6, further comprising:
guying a foundation at ground level;

lowering the first section onto the foundation; and
guying the first section to an anchor.

9. The method of claim 6, further comprising, after lowering the second section onto the first section:
fastening the second section to the first section; and
guying the second section to an anchor.

10. The method of claim 9, further comprising, after fastening the second section to the first section, removing the first alignment frame from the first and second sections.

11. The method of claim 9, further comprising, after fastening the second section to the first section:
lowering a third section of the emergency restoration structure onto the second section such that the third section is aligned with the second section by an alignment portion of a second alignment frame of the emergency restoration structure; and
capturing a portion of the second alignment frame to a hook of the second alignment frame.

12. An emergency restoration structure comprising:
a first section comprising a first end configured to be mounted to a foundation, and a second end opposite the first end, the first section being assembled as a truss-like structure;
a second section comprising a first end configured to be coupled to the second end of the first section, and a second end opposite the first end of the second section, the second section being assembled as a truss-like structure; and
a first alignment frame including a bottom portion configured to be coupled to the second end of the first section, and a top portion configured to be coupled to the first end of the second section, the bottom portion being configured to be coupled to the first section so as to surround a perimeter of the first section, and the top portion being configured to be coupled to the second section so as to surround a perimeter of the second section, the first alignment frame comprising:
an alignment portion arranged on at least one of the bottom portion and the top portion, the alignment portion comprising a plurality of inclined surfaces configured to abut and guide respective portions of the other of the bottom portion and the top portion as the other of the bottom portion and the top portion is moved in a longitudinal direction toward the at least one of the bottom portion and the top portion; and
a hook arranged on one of the bottom portion and the top portion and configured to receive a cross bar of the other of the bottom portion and the top portion.

13. An emergency restoration structure comprising:
a first section comprising a first end configured to be mounted to a foundation, and a second end opposite the first end, the first section being assembled as a truss-like structure;
a second section comprising a first end configured to be coupled to the second end of the first section, and a second end opposite the first end of the second section, the second section being assembled as a truss-like structure; and
a first alignment frame including a bottom portion configured to be coupled to the second end of the first section, and a top portion configured to be coupled to the first end of the second section, the bottom portion being configured to be coupled to the first section so as to surround a perimeter of the first section, and the top portion being configured to be coupled to the second section so as to surround a perimeter of the second section, the first alignment frame comprising:
an alignment portion arranged on at least one of the bottom portion and the top portion;
a hook arranged on one of the bottom portion and the top portion and configured to receive a cross bar of the other of the bottom portion and the top portion; and
an energy absorbing member extending away from at least one of the top portion or the bottom portion and configured to abut an inner surface of at least one of the first section or the second section.

14. The emergency restoration structure of claim 13, wherein the energy absorbing member comprises at least one of a rod or a wire.

15. An emergency restoration structure comprising:
a first section comprising a first end configured to be mounted to a foundation, and a second end opposite the first end, the first section being assembled as a truss-like structure;
a second section comprising a first end configured to be coupled to the second end of the first section, and a second end opposite the first end of the second section, the second section being assembled as a truss-like structure;
a first alignment frame including a bottom portion configured to be coupled to the second end of the first section, and a top portion configured to be coupled to the first end of the second section, the bottom portion being configured to be coupled to the first section so as to surround a perimeter of the first section, and the top portion being configured to be coupled to the second section so as to surround a perimeter of the second section, the first alignment frame comprising:
an alignment portion arranged on at least one of the bottom portion and the top portion; and
a hook configured to receive a portion of at least one of the bottom portion and the top portion; and
a third section comprising a first end configured to be coupled to the second end of the second section, and a second end opposite the first end of the third section; and
a second alignment frame including a bottom portion configured to be coupled to the second end of the second section, and a top portion configured to be coupled to the first end of the third section, the second alignment frame comprising:
an alignment portion arranged on at least one of the bottom portion of the second alignment frame or the top portion of the second alignment frame; and
a hook configured to receive a portion of at least one of the bottom portion of the second alignment frame or the top portion of the second alignment frame.

* * * * *